United States Patent
Kingsborough

(10) Patent No.: US 11,756,027 B2
(45) Date of Patent: Sep. 12, 2023

(54) SYSTEM FOR PACKAGING, PROCESSING, AND ACTIVATING A BUNDLED GREETING AND GIFT CARD

(71) Applicant: Blackhawk Network, Inc., Pleasanton, CA (US)

(72) Inventor: Donald Kingsborough, Danville, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 319 days.

(21) Appl. No.: 17/143,199

(22) Filed: Jan. 7, 2021

(65) Prior Publication Data

US 2021/0125174 A1    Apr. 29, 2021

Related U.S. Application Data

(60) Continuation of application No. 16/161,549, filed on Oct. 16, 2018, now Pat. No. 10,915,889, which is a
(Continued)

(51) Int. Cl.
*G06Q 30/00*    (2023.01)
*G06Q 20/34*    (2012.01)
(Continued)

(52) U.S. Cl.
CPC ..... *G06Q 20/354* (2013.01); *G06K 19/06028* (2013.01); *G06K 19/06187* (2013.01);
(Continued)

(58) Field of Classification Search
CPC .................. G06Q 20/354; G06K 19/06028
See application file for complete search history.

(56) References Cited

U.S. PATENT DOCUMENTS 6,732,459 B1    5/2004   Clark
6,961,714 B1    11/2005  LeVine
(Continued)

FOREIGN PATENT DOCUMENTS

WO    2011079066 A1    6/2011

OTHER PUBLICATIONS

Filing receipt and specification for provisional patent application entitled "System for Packaging, Processing, and Activating a Bundled Greeting and Gift Card," by Donald Kingsborough filed Dec. 21, 2009 as U.S. Appl. No. 61/288,766.
(Continued)

*Primary Examiner* — Rokib Masud
(74) *Attorney, Agent, or Firm* — Barnes & Thornburg LLP; Jerry C. Harris, Jr.

(57) ABSTRACT

A greeting card stored-value card combinations and methods of forming said combinations are provided. In one embodiment, these combinations include a greeting card comprising means for affixing a stored-value card thereto. These combinations also include a stored-value card affixed to the greeting card. A single identifier, such as a Stock-Keeping Unit (SKU) or a Universal Product Code (UPC), is assigned to the bundle that uniquely identifies the bundled greeting card and stored-value card. The single identifier provides identification means allowing the stored-value card to be activated. A single capture of the single identifier enables the customer to both purchase the greeting card stored-value card combination product as well as to activate the store-value card.

19 Claims, 4 Drawing Sheets

Related U.S. Application Data continuation of application No. 14/927,362, filed on Oct. 29, 2015, now Pat. No. 10,127,548, which is a division of application No. 13/618,678, filed on Sep. 14, 2012, now Pat. No. 9,202,240, which is a continuation of application No. 13/518,367, filed as application No. PCT/US2010/061268 on Dec. 20, 2010, now Pat. No. 9,691,064.

(60) Provisional application No. 61/288,766, filed on Dec. 21, 2009.

(51) Int. Cl.
    *G06Q 30/06*      (2023.01)
    *G06K 19/06*      (2006.01)
    *G06K 19/077*     (2006.01)
    *G06Q 20/20*      (2012.01)
    *G06K 19/07*      (2006.01)

(52) U.S. Cl.
    CPC ....... *G06K 19/077* (2013.01); *G06K 19/0723* (2013.01); *G06Q 20/20* (2013.01); *G06Q 30/06* (2013.01)

(56) References Cited

U.S. PATENT DOCUMENTS

| | | | |
|---|---|---|---|
| 7,024,807 B2 * | 4/2006 | Street | G09F 1/10 40/124.06 |
| 7,198,196 B2 | 4/2007 | Halbur et al. | |
| 7,614,548 B2 | 11/2009 | Schultz et al. | |
| 7,702,587 B2 | 4/2010 | Nguyen et al. | |
| 7,734,506 B2 | 6/2010 | Ouchi | |
| 7,806,287 B2 | 10/2010 | Rouns | |
| 8,484,127 B2 | 7/2013 | Olliphant | |
| 8,577,735 B2 | 11/2013 | Wilen et al. | |
| 9,202,240 B2 | 12/2015 | Kingsborough | |
| 2002/0091573 A1 * | 7/2002 | Hodes | G07F 17/42 705/17 |
| 2007/0187488 A1 * | 8/2007 | Martinez | G06Q 30/00 235/380 |
| 2007/0278296 A1 | 12/2007 | Dwyre et al. | |
| 2009/0327128 A1 | 12/2009 | Olliphant | |
| 2010/0017278 A1 | 1/2010 | Wilen et al. | |
| 2012/0265624 A1 | 10/2012 | Kingsborough | |

OTHER PUBLICATIONS

Foreign communication from a related counterpart application—International Search Report and Written Opinion, PCT/US10/61268 dated Feb. 28, 2011, 7 pages.

Filing receipt and specification for patent application entitled "System for Packaging, Processing, and Activating a Bundled Greeting and Gift Card," by Donald Kingsborough filed Jun. 21, 2012 as U.S. Appl. No. 13/518,367.

Office Action dated Mar. 27, 2013 (13 pages), U.S. Appl. No. 13/518,367.

Office Action (Final) dated Oct. 8, 2013 (17 pages), U.S. Appl. No. 13/518,367.

Foreign communication from a related counterpart application—International Preliminary Report on Patentability, PCT/US2010/061268, dated Jun. 26, 2012, 5 pages.

Foreign communication from a related counterpart application—Mexican Office Action, Application No. MX/a/2012/007196, dated Nov. 25, 2013, 9 pages.

Advisory Action dated Jan. 29, 2014 (3 pages), U.S. Appl. No. 13/518,367.

Foreign communicaiton from a related counterpart applications, International Preliminary Report on Pantentability, PCT/US2010/061268, dated Jun. 26, 2013, 9 pages.

Examiner's Answer dated Aug. 28, 2014, U.S. Appl. No. 13/518,367, 7 pages.

* cited by examiner

SYSTEM FOR PACKAGING, PROCESSING, AND ACTIVATING A BUNDLED GREETING AND GIFT CARD

CROSS-REFERENCE TO RELATED APPLICATIONS

This application is a continuation of and claims priority to U.S. patent application Ser. No. 16/161,549 filed Oct. 16, 2018, which is a continuation of and claims priority to U.S. patent application Ser. No. 14/927,362 filed Oct. 29, 2015, which is a divisional of and claims priority to U.S. patent application Ser. No. 13/618,678 filed Sep. 14, 2012, now U.S. Pat. No. 9,202,240, which is a continuation of and claims priority to U.S. patent application Ser. No. 13/518,367 filed on Jun. 21, 2012, now U.S. Pat. No. 9,691,064, which is a filing under 35 U.S.C. 371 of International Application No. PCT/US2010/061268 filed Dec. 20, 2010, entitled "System for Packaging, Processing, and Activating a Bundled Greeting and Gift Card," claiming priority of U.S. Provisional Patent Application No. 61/288,766 filed Dec. 21, 2009, which applications are incorporated by reference herein in their entirety.

BACKGROUND

This invention relates to packaging and processing of bundled greeting and stored-value cards.

Stored-value cards and greeting cards are often combined by consumers for gifting. Typically, when purchasing these items, the stored-value card and the greeting card must be purchased separately; thus, involving two separate transactions. The purchase transaction for a greeting card is typically conducted at a point of sale (POS) terminal by reading the associated bar code that is imprinted on the greeting card. Like a greeting card, a stored-value card's purchase transaction typically occurs at a POS terminal. However, a stored-value card is typically purchased and activated by some combination of the following steps: (a) a POS terminal reads a bar code imprinted on the packaging associated with the stored-value card, (b) a POS terminal reads a bar code that is imprinted on the stored-value card, and (c) the stored-value card's magnetic strip is swiped at the terminal. However, as described above, the process for purchasing a greeting card and a stored-value card together can be rather cumbersome.

SUMMARY

Disclosed herein are greeting card stored-value card combinations and methods of forming said combinations. In one embodiment, these combinations include a greeting card comprising means for affixing a stored-value card thereto. These combinations also include a stored-value card affixed to the greeting card. A single identifier, such as a stockkeeping unit (SKU) or a Universal Product Code, is assigned to the bundle that uniquely identifies the bundled greeting card and stored-value card. The single identifier provides identification means allowing the stored-value card to be activated. The identifier may be imprinted or encoded on the greeting card, the stored-value card, any packaging enclosing the greeting card and stored-value card, or any combination thereof. The SKU may be imprinted on the greeting card, stored-value card, and/or packaging as an optically readable insignia, such as, for example, a Universal Product Code (UPC). Alternatively, the single identifier may be encoded on a magnetic strip deposited on any or all of the greeting card, stored-value card, and packaging. As another alternative, the single identifier may be encoded on a Radio Frequency Identification (RFID) chip or tag affixed to one or more of the greeting card, stored-value card, and packaging (if any). A single capture of the single identifier enables the customer to both purchase the greeting card/stored-value card combination product as well as to activate the store-value card.

Disclosed herein is also a computer implemented method for processing greeting card/stored-value card bundled sales. The method comprises receiving at a stored-value card transaction processor an identifier from a greeting card/stored-value card bundled product captured at a point of sale terminal wherein the identifier uniquely identifies the greeting card/stored-value card combination bundle. The stored-value card transaction processor then activates the stored-value card and updates a datastore of stored-value card activation states stored in a datastore in the internal card processing service to indicate that the stored-value card identified by the identifier has been activated. The stored-value card transaction processor then transmits an activation response to the point of sale terminal. The stored-value card transaction processor also determines an amount of the purchase amount received from the sale of the greeting card/stored-value card bundle to credit an account associated with the stored-value card issuer, an amount of the purchase amount received from the sale of the greeting card/stored-value card bundle to credit to an account associated with the card transaction processor, and an amount of the purchase amount received form the sale of the greeting card/stored-value card bundle to credit to an account associated with the greeting card/stored-value card bundled product selling vendor. The stored-value card transaction processor reconciles each of the accounts to reflect the allocation of the purchase amount received and initiates funds transfers between bank accounts belonging to the vendor, the card issuer, the purchaser, and the stored-value card transaction processor administrator to reflect the allocation.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION

In one embodiment, a stored-value card and a greeting card are bundled together where both items can be purchased using a single identifier, e.g., a bar code, and the associated stored-value card is activated using the single identifier. Such a system makes it more convenient for both the consumer and sales agent. The single identifier can be a bar code that is imprinted on either the Greeting Card or imprinted on the Stored-value Card, or can be encoded on the magnetic strip on the Stored-value Card. The identifier can also be a Radio Frequency Identification (RFID) tag or chip.

Figure 1A:
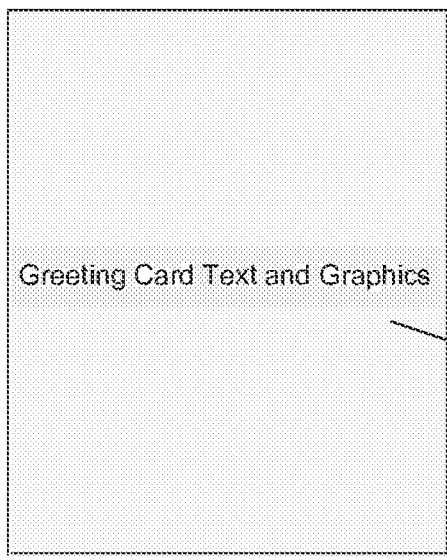
FIG. 1A shows the front of an exemplary bi-fold greeting card for containing a stored-value card in a greeting card/stored-value card combination.

FIG. 1A depicts the front 102 of a standard bi-fold greeting card. FIG. 2A depicts the inside 104 of an exemplary standard bi-fold greeting card with stored-value card 106 affixed to the inside of the greeting card. FIG. 2C depicts the back 108 of an exemplary standard bi-fold greeting card containing a bar code 110 which identifies both the greeting card and also uniquely identifies the stored-value card 106 included with the combination. This single bar code identifier 110 allows the stored-value card 106 to be activated contemporaneously with the purchase of the greeting card stored-value card combination without requiring additional identifiers to be determined and entered into a point of sale terminal. Although depicted solely on the greeting card, the identifier could also be encoded on the stored-value card as, for example, an optically readable insignia, a magnetically encoded strip, or an RFID tag.

The stored-value card can be affixed to the greeting card with any number of means including, for example, by means of glue or by means of sealing the stored-value card to the greeting card with cellophane or some other type of plastic or other material. Alternatively, the greeting card may contain a sleeve or jacket configured to hold the stored-value card inside the greeting card or have notches cut out of the greeting card configured to hold the stored-value card inside the greeting card. As another alternative, the stored-value card may be affixed to the outside of the greeting card so that the consumer may see the kind of stored-value card that is included with the greeting card. In order to deter fraud, the greeting card and stored-value card may be sealed inside a protective packaging, such as a clear cellophane wrapper.

The stored-value card is not required to be bundled with a bi-fold greeting card, but can be bundled with any type greeting card including, for example, tri-fold and multi-page greeting cards. Additionally, the greeting card may include other features such as, for example, a sound chip to play a pre-recorded song when the card is opened by the recipient or a recordable sound chip allowing the consumer to record their own message to be played when the greeting card is opened by the recipient.

Although the greeting card/stored-value card combination is packaged and sold as a single product, the greeting card and the stored-value card need not be manufactured and/or issued by the same entity. In some embodiments, the greeting card and the stored-value card may be manufactured by and/or issued by or on behalf of the same entity or different entities. Furthermore, the vendor selling the greeting card stored-value card combination may be the same entity or related entity to the entity issuing the greeting card and/or the entity issuing the stored-value card. However, the vendor selling the combination may not be the same or related entity to either of the entities that have issued the greeting card and/or the stored-value card. Additionally, the merchant or merchants at which the stored-value card may be redeemed may be the same, related, or different entity from any of the greeting card issuer, stored-value card issuer, and the greeting card/stored-value card combination product selling vendor. Also, the stored-value card transaction processing system that is utilized to activate, process, and redeem the stored-value card may be the same or related entity to any of the combination selling vendor, greeting card issuer, stored-value card issuer, and redeeming merchant. Alternatively, the stored-value card transaction processing system may be an entity unrelated to any of the combination selling vendor, greeting card issuer, stored-value card issuer, and redeeming merchant.

In other embodiments, the greeting card may have multiple identifiers serving different functions with at least one identifier that uniquely identifies the greeting card/stored-value card combination. Furthermore, the greeting card/stored-value card combination product may be enclosed inside additional packaging with the identification that identifies the greeting card/stored-value card combination product imprinted or otherwise encoded on the packaging.

In one embodiment, the identifier encoded on the greeting card is an optically scannable insignia, such as, for example, a bar code. The bar code may be a universal product code (UPC), e.g., a EAN/UCC-12 or UPC-12 bar code; and a EAN/UCC-128 bar code or UPC-128 bar code. The bar code may also be one of a European Article Number (EAN), a Global Trade Item Number (GTIN), and an Australian Product Number (APN). In other embodiments, the identifier encoded on the greeting card is a Radio Frequency Identification (RFID) chip affixed to the greeting card. The stored-value card may be, for example, a prepaid credit card, a prepaid calling card, a prepaid stored-value card redeemable by a specific merchant or merchants. The stored-value card may be for a specific product or service. The stored-value card is typically a wallet sized card of similar size to standard credit and debit cards. The stored-value card may include a magnetic strip attached to it having an identification uniquely identifying the stored-value card encoded on the magnetic strip and, in some embodiments, it can also identify the greeting card/stored-value card combination product. The stored-value card may have an optical code imprinted on it in which the optical code includes information uniquely identifying the stored-value card. The optical code may be a bar code. The bar code may be a UPC code. The stored-value card may have an RFID tag or chip affixed to it which includes an identifier encoded on the RFID tag or chip which uniquely identifies the stored-value card. The stored-value card may have its unique identifier encoded on it in more than one way. For example, a stored-value card may include both a UPC bar code and a magnetic strip.

In one embodiment, a single identifier is imprinted or otherwise encoded on the greeting card. The single identifier encodes information sufficient to uniquely identify the particular greeting card/stored-value card combination as well as to uniquely identify the stored-value card thereby allowing the stored-value card to be activated when the greeting card/stored-value card combination is purchased (one-step process). The information allows the point of sale system or the card processing system to determine the purchase price of the greeting card/stored-value card combination as well as to determine the allocation of funds received for the purchase of the combination between the greeting card and the stored-value card.

Figure 2:
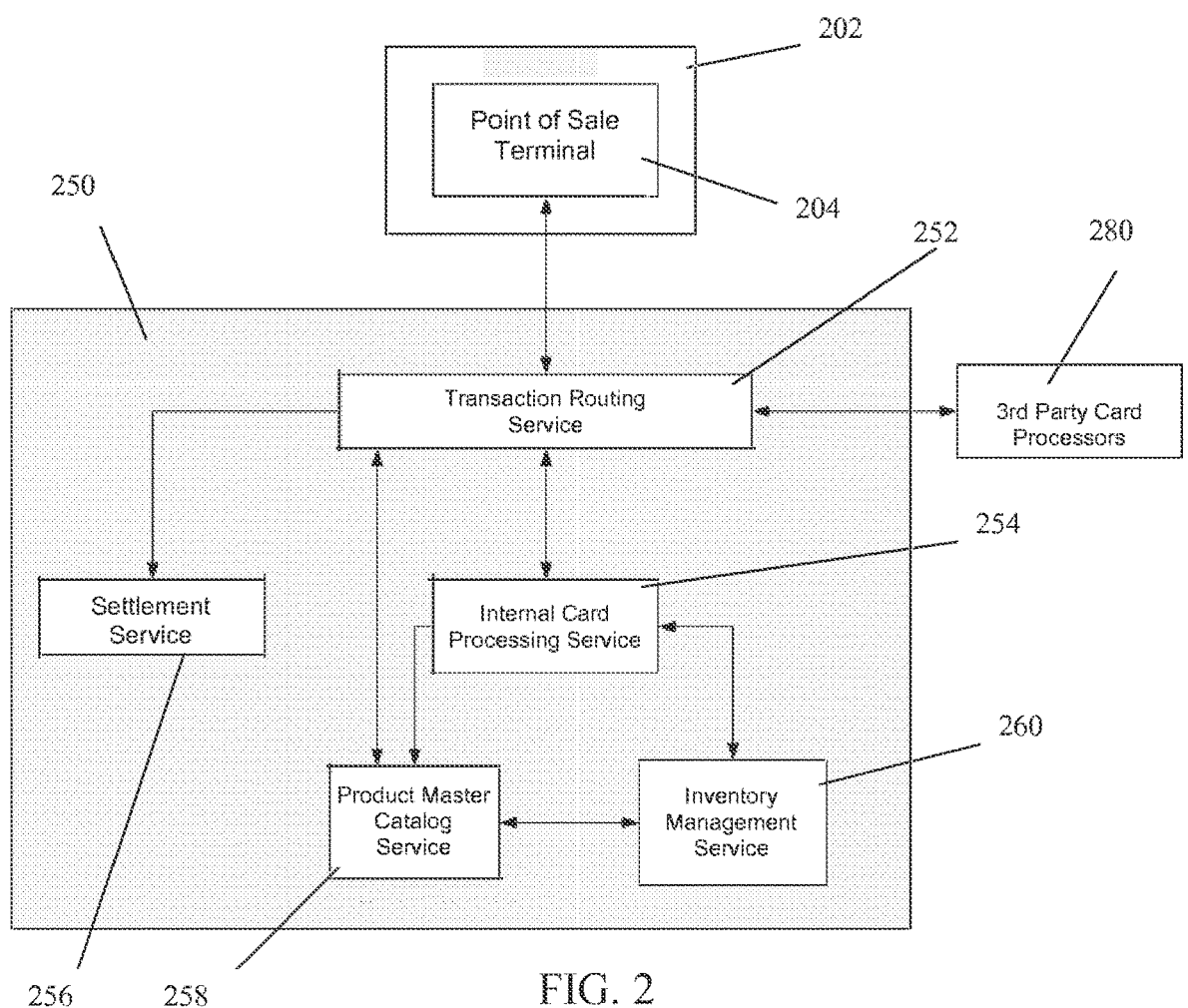
FIG. 2 shows an exemplary system architecture for activating a stored-value card purchased in a greeting card/stored-value card combination.

Referring now to FIG. 2, an exemplary system architecture for activating a stored-value card that is part of a greeting card/stored-value card bundle is depicted. The architecture includes merchants 202, a stored-value card transaction processing system 250, and third party card processors 280. The merchants 202 each have point of sale terminals 204 that can acquire the identification of the greeting card/stored-value card combination through various methods as discussed above. The point of sale terminal 204 is in secure communication with the stored-value card transaction processing system 250. This communication may be over the Internet, the Public Switched Telephone Network (PSTN), or over a dedicated communication line. The communication between the point of sale terminal 204 and the stored-value card transaction processing system 250 is encrypted for security. The communication between the point of sale terminal 204 and the stored-value card transaction processing system 250 may utilize a Virtual Private Network (VPN).

The stored-value card transaction processing system 250 comprises a transaction routing service 252, an internal card processing service 254, a settlement service 256, a product master catalog service 258, and an inventory management service 260. The transaction routing service 252 communicates with the point of sale terminal 204 as well as $3^{rd}$ party card processors 280.

The point of sale terminal 204 may include various input devices to capture identifiers from the greeting card/stored-value card combination product. For example, the point of sale terminal 204 may include a bar code reader, a magnetic strip reader, and/or an RFID reader. Other optical readers and other types of input devices may be utilized as well. The point of sale terminal 204 may include a keypad for receiving a PIN from the customer if the stored-value card requires a PIN to be entered for activation and redemption.

The transaction routing service 252 receives stored-value card activation requests from the point of sale terminal 204 and determines which card processor to forward the activation request, by for example, comparing the identification of the greeting card/stored-value card combination product to be activated to information in the product master catalog service 258 to determine whether the combination product corresponds to a product for which the stored-value card transaction processing system 250 acts as the card processor. Thus, for example, if the stored-value card is a stored-value card processed by the stored-value card transaction processing system 250, then the transaction routing service may forward the activation request to the internal card processing service 254 within the stored-value card transaction processing system 250 or is one processed by one of the $3^{rd}$ party card processors 280. If the stored-value card is processed by one of the $3^{rd}$ party card processors 280, the transaction routing service 252 routes the activation request to the $3^{rd}$ party card processor 280 for activation processing. The transaction routing service 252 receives activation responses from the appropriate one of the $3^{rd}$ party card processors and transmits the activation response back to the point of sale terminal 204.

If the transaction routing service 252 determines that the stored-value card is one that is processed by the stored-value card transaction processing system 250 (and not merely an activation request for which the stored-value card transaction processing system 250 serves as a routing service), the transaction routing service 250 forwards the activation request from the point of sale terminal 204 to the internal card processing service 254 which uses the information contained in the activation request to determine whether to activate the stored-value card. If the activation request is successful, the internal card processing service 254 transmits a successful activation response to the transaction routing service 252 which forwards the response to the point of sale terminal 204. The internal card processing service 254 also updates a datastore of activation states to indicate that the stored-value card has been activated. The internal card processing service 254 may also update an inventory management service 260 to indicate that number of greeting card/stored-value cards remaining with the merchant 202 after the conclusion of the sale of the subject greeting card/stored-value card combination product. The internal card processing service 254 may also compare the stored-value card type to types of cards issued by the stored-value card issuer in the product master catalog service to help verify that the stored-value card is authentic.

The transaction routing service 252 also routes activation information to the settlement service 256 if the internal card processing service 254 activates the card. The settlement service 256 allocates appropriate portions of the purchase price of the greeting card/stored-value card combination among the various entities involved in the transaction. These entities include the appropriate one of the merchants 202 selling the greeting card/stored-value card combination, the entity issuing the stored-value card, and the stored-value card transaction processing system 250 operator. This amount may be a percentage of the amount of the selling price of the greeting card/stored-value card combination product. The settlement service 256 may also allocate amounts received for the purchase of the greeting card/stored-value card combination to the stored-value card issuer and the stored-value card transaction processing system 250 operator.

Figure 3:
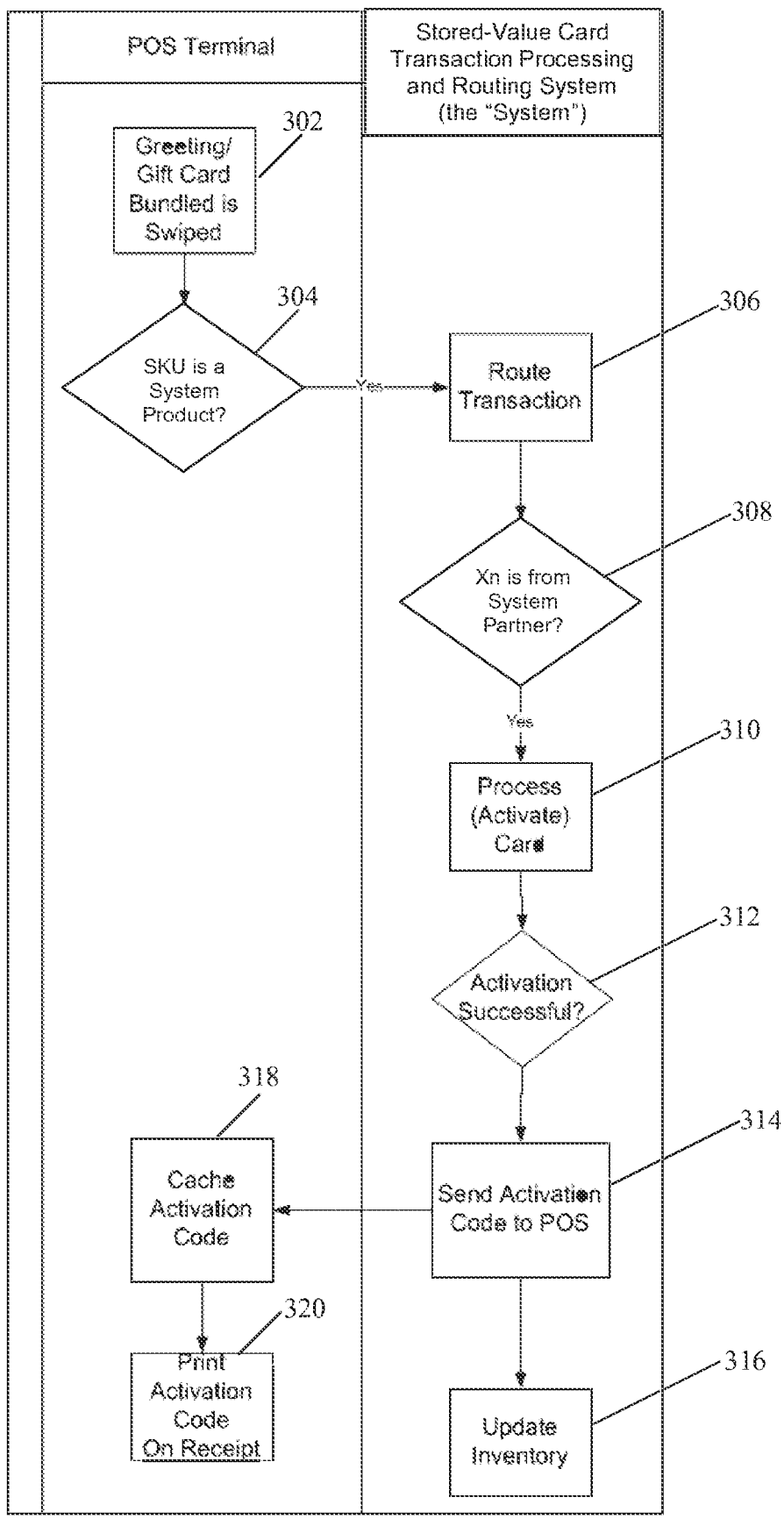
FIG. 3 shows an exemplary flowchart for processing an activation request for a stored-value card purchased in a greeting card/stored-value card combination.

FIG. 3 depicts a flowchart illustrating an exemplary process for activating a greeting card/stored-value card combination. The process begins in block 302 with a point of sale terminal 204 determining a unique identifier from a greeting card/stored-value card bundle. If the SKU identifier is a Stored-Value Card Transaction Processing and Routing system product (i.e., a product serviced by the Stored-Value Card Transaction Processing and Routing system) as determined in block 304, then an activation request is transmitted to the stored-value card transaction processing system 250 for routing the transaction in block 306. If, in block 308, it is determined that the transaction is from a system partner then the system processes the card activation request in block 310. If the activation is successful in block 312, then the Stored-Value Card Transaction Processing and Routing System sends an activation code to the point of sale terminal 204 in block 314. The Stored-Value Card Transaction Processing and Routing System then updates the inventory to reflect that the stored-value card has been activated in block 316. The point of sale terminal 204 receives the activation code and caches the activation code in block 318. The point of sale terminal 204 may print an activation code on the receipt in block 320 if the customer is required to perform further actions in order to activate the stored-value card.

Figure 1B:
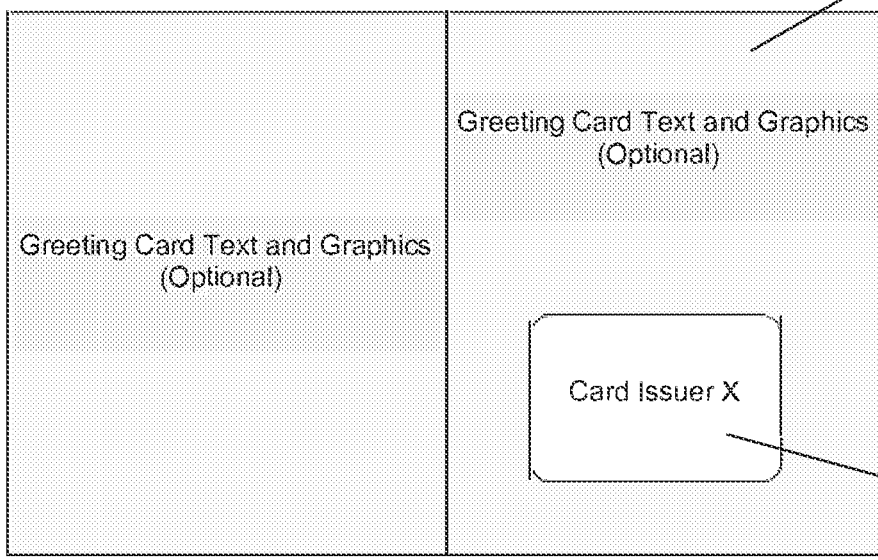
FIG. 1B shows the inside of an exemplary bi-fold greeting card for containing a stored-value card as well as a stored-value card in a greeting card/stored-value card combination.
Figure 1C:
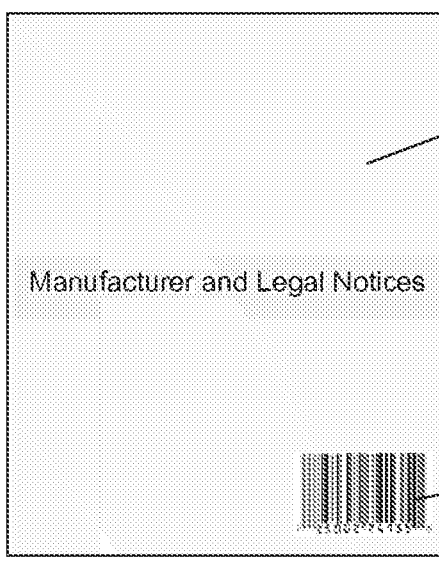
FIG. 1C shows the back of an exemplary bi-fold greeting card for containing a stored-value card in a greeting card/stored-value card combination.

Returning again to FIGS. 1A-1C, in some embodiments, the greeting card identifier is only sufficient to identify the type of greeting card/stored-value card combination (e.g., the type of greeting card and that the stored-value card is a $25 VISA debit card), but not to specifically identify the unique identity of the particular stored-value card contained within the greeting card. Such identification would be sufficient to determine the price and perhaps the allocation of the purchase money received between the greeting card and the stored-value card, but it would not be sufficient to allow the stored-value card to be activated. In these embodiments, the greeting card may contain a small hole in, for example, the back of the greeting card, and the stored-value card may be affixed inside the greeting card such that an optical indicia, such as a bar code, may be visible through the greeting card and readable by an appropriate scanner or other input device. Purchase and activation of the greeting card/stored-value card combination in such embodiments would comprise a two step process. First, the greeting card identifier is ascertained to determine the price of the card combination and then, second, the optical indicia on the stored-value card which is visible through the greeting card is scanned to ascertain the unique identity of the stored-value card and activate the stored-value card.

In other embodiments in which the greeting card identifier is insufficient to uniquely identify the stored-value card contained within the greeting card, the stored-value card may be encoded with an RFID chip or tag containing information sufficient to uniquely identify the stored-value card and activate the stored-value card. In such embodiments, it would not be necessary for the greeting card to contain a hole since the RFID tag is readable by an RFID reader without being visible. The RFID on the stored-value card may be utilized only for activation purposes or may also be used for redemption purposes as well.

For fraud protection, in order to activate a stored-value card where the identification encoded on the greeting card is insufficient to uniquely identify the stored-value card, the greeting card identification plus the stored-value card identification may be required to be transmitted contemporaneously and may be required to correlate to each other to ensure that a person has not removed a stored-value card from one greeting card and inserted it into a different greeting card that is sold at a lower price. For example, one set of greeting cards/stored-value card combinations may include a $50 stored-value card which may be purchased for $55 ($50 stored-value card plus $5 for the greeting card). Another set of greeting card/stored-value card combinations may include $25 stored-value cards which may be purchased for $30 ($25 stored-value card plus $5 for the greeting card). Thus, by requiring the contemporaneous transmission of both the greeting card identification as well as the stored-value card identification, as well as also requiring that the two identifications correlate with each other, inhibits someone from removing a $50 stored-value card from the $55 greeting card/stored-value card combination and inserting it into a $30 greeting card/stored-value card combination.

In other embodiments in which the identification encoded on the greeting card is insufficient to uniquely identify the stored-value card included in the greeting card/stored-value card combination, the greeting card may not be sealed closed such that the greeting card may be opened allowing an identification encoded on the stored-value card to be determined by the point of sale terminal operator and submitted with the combination purchase and activation request transmitted to a stored-value card transaction processing system. In some embodiments, the identification of the stored-value card is encoded on a magnetic strip attached to the stored-value card. Such as embodiment may require the point of sale terminal operator to remove the stored-value card and swipe the card through a magnetic reader.

Returning again to FIG. 2, the transaction routing service 252 also routes activation information to the settlement service 256 if the internal card processing service 254 activates the card. The settlement service 256 allocates appropriate portions of the purchase price of the greeting card/stored-value card combination among the various entities involved in the transaction. These entities include the appropriate one of the merchants 202 selling the greeting card/stored-value card combination, the greeting card manufacturer, the entity issuing the stored-value card, and the stored-value card transaction processing system 250 operator. The appropriate one of the merchants 202 selling the greeting card/stored-value card combination may receive a portion of the purchase amount collected by the merchant that has been allocated toward the purchase price of the greeting card. The appropriate one of the merchants 202 selling the greeting card/stored-value card combination may also receive a portion of the purchase amount allocated to the stored-value card. This amount may be a percentage of the amount of the denomination of the stored-value card. The settlement service 256 may also allocate amounts received for the purchase of the greeting card/stored-value card combination to the stored-value card issuer and the stored-value card transaction processing system 250 operator.

In some embodiments, a system at the merchants 202 location or at the point of sale terminal 204 determines the amount of money to allocate toward the greeting card by the purchase of a greeting card/stored-value card combination product. The merchants may then transfer the remaining part of the purchase amount for the greeting card/stored-value card combination product to the stored-value card transaction processing system 250 which may then allocate and distribute the remaining funds to the card issuer, the stored-value card transaction processing system administrator, and, in some cases, a portion of the price allocated to the stored-value card is allocated to be distributed back to the merchant that sold the greeting card/stored-value card combination product.

Figure 4:
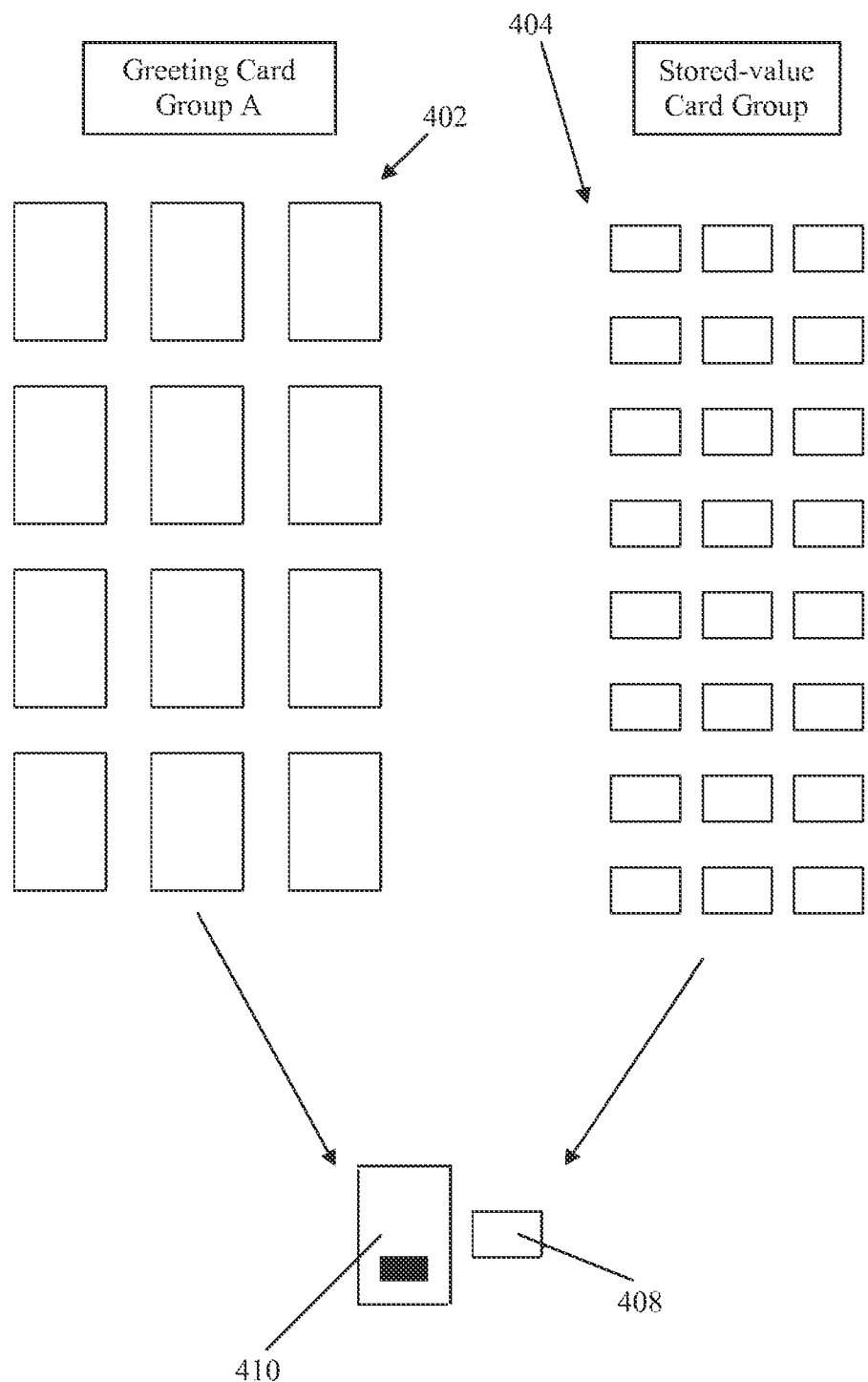
FIG. 4 depicts an alternate method of providing a greeting card/stored-value card combination product.

An alternate method of providing a greeting card/stored-value card combination product is depicted in FIG. 4. In this embodiment, rather than a stored-value card being prepackaged with a greeting card, the customer is presented with group 402 of a plurality of greeting cards and a group 404 of a plurality of stored-value cards. The customer may select one greeting card from greeting card group A 402 and one stored-value card from stored-value card group A 404 and bundle them together into a single product. The selected greeting card 410 may comprise a sleeve or other means for affixing the select stored-value card 408 to the greeting card 410. The price of any pair of greeting cards and stored-value cards selected from this group may be sold for the same price. The group of greeting cards and the group of stored-value cards provides the customer with options for different greeting cards appropriate for different occasions and options for selecting the appropriate stored-value card suitable for the intended recipient of the greeting card/stored-value card combination. The stored-value cards may provide a selection of stored-value cards usable at different restaurants plus a selection of stored-value cards usable at various and different merchants as well as stored-value cards the are redeemable at a host of merchants and locations, such as, for example, a VISA stored-value card. Thus, utilizing only a limited number of greeting cards and stored-value cards, the retailer is able to provide the customer with options for exceeding the number of greeting card types or the number of stored-value card types without using a significant amount of retail space. Thus, the customer has the convenience of purchasing a single item, the bundled greeting card stored-value card product while still having a large variety of choices among which to select.

Purchasing and activation of a greeting card/stored-value card product in this embodiment may require a two step process of obtaining the identification of the greeting card and the stored-value card since the greeting card identification would not uniquely identify the stored-value card. Obtaining two identifications could also help with fraud prevention by ensuring that the stored-value card and the greeting card bundled by the consumer are actually intended to be sold together as a single unit. Alternatively, the identification obtained from the stored-value card could identify that the stored-value card is sold with an accompanying greeting card and indicate the price for the combination thereby eliminating the need to obtain an identifier from the greeting card. Such an embodiment could be suitable for situations in which all greeting cards are sold for the same price thereby negating the need for determining whether the greeting card corresponds to the stored-value card.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

Reference is further made to the following specific embodiments:

1. A greeting card stored-value card combination product, comprising:
   a greeting card;
   a stored-value card;
   a means for affixing the stored-value card to the greeting card;
   a card identifier uniquely identifying the stored-value card, wherein the card identifier provides a means for activating the stored-value card; and
   an identifier encoded on at least one of the greeting card and the stored-value card; wherein the identifier identifies the combination of the greeting card and the stored-value card thereby differentiating the combination from other combinations of greeting cards and stored-value cards.

2. A greeting card stored-value card combination product, comprising:
   a greeting card;
   a stored-value card; and
   a means for affixing the stored-value card to the greeting card;
   an identifier encoded on at least one of the greeting card and the stored-value card; wherein the identifier identifies the combination of the greeting card and the stored-value card thereby differentiating the combination from other combinations of greeting cards and stored-value cards and providing an identifying means for activating the stored-value card.

3. The greeting card stored-value card combination product of embodiment 1 or 2 wherein the means for affixing the stored-value card to the greeting card comprise one of an adhesive, a sleeve, notches formed in the greeting card, and a material wrapping the stored-value card proximate to the greeting card.

4. The greeting card stored-value card combination product of embodiment 3, wherein the material is a substantially transparent.

5. The greeting card stored-value card combination product of embodiment 3 or 4, wherein the material is a plastic.

6. The greeting card stored-value card combination product of embodiment 3 or 4, wherein the material is cellophane.

7. The greeting card stored-value card combination product of embodiment 1, 2, 3, 4, 5, or 6 wherein the identifier comprises at least one of an optically readable insignia, a magnetically encoded strip, and a radio frequency identification tag.

8. The greeting card stored-value card combination product of embodiment 1, 2, 3, 4, 5, 6, or 7, wherein the greeting card comprises a substantially transparent portion through which the identifier located on the stored-value card enclosed within the greeting card is visible and readable by an optical scanning input device.

9. The greeting card stored-value card combination product of embodiment 8, wherein the substantially transparent portion comprises a hole in the greeting card.

10. The greeting card stored-value card combination product of embodiment 1, 2, 3, 4, 5, 6, 7, 8, or 9, wherein the stored-value card is activatable by a one-step process.

11. The greeting card stored-value card combination product of embodiment 1, 2, 3, 4, 5, 6, 7, 8, 9, or 10, wherein the stored-value card is activatable by a two-step process.

12. A computer implemented method for processing a sale of the greeting card stored-value card combination product of embodiment 1, 2, 3, 4, 5, 6, 7, 8, 9, 10, or 11, the method comprising;
    receiving, at a transaction routing service, an activation request from a point of sale terminal wherein the activation request includes an identifier from the greeting card stored-value card combination product captured at a point of sale terminal, wherein the identifier identifies the product;
    determining, with the transaction routing service, a card processing service corresponding to the identifier;
    transmitting the activation request to the card processing service from the transaction routing service;
    receiving, at the transaction routing service, an activation response from the card processing service; and
    transmitting the activation response from the transaction routing service to the point of sale terminal.

13. A computer implemented method for processing a sale of the greeting card stored-value card combination product of embodiment 1, 2, 3, 4, 5, 6, 7, 8, 9, 10, or 11, the method comprising;
    receiving, at a transaction routing service, an activation request from a point of sale terminal wherein the activation request includes an identifier from the greeting card stored-value card combination product captured at a point of sale terminal and a card identifier uniquely identifying a stored-value card included in the greeting card stored-value card combination product captured at a point of sale terminal, wherein the identifier identifies the product;
    determining, with the transaction routing service, a card processing service corresponding to the card identifier;
    transmitting the activation request, including the card identifier, to the card processing service from the transaction routing service;
    receiving, at the transaction routing service, an activation response from the card processing service; and
    transmitting the activation response from the transaction routing service to the point of sale terminal.

14. The method of embodiment 12 or 13, further comprising determining an amount of the purchase amount received from the sale of the greeting card stored-value card combination product to credit an account associated with a stored-value card issuer.

15. The method of embodiment 12, 13 or 14, further comprising determining an amount of the purchase amount received from the sale of the greeting card stored-value card combination product to credit to an account associated with a card transaction processor.

16. The method of embodiment 12, 13, 14, or 15, further comprising determining an amount of the purchase amount received form the sale of the greeting card stored-value card combination product to credit to an account associated with a greeting card stored-value card combination product selling vendor.
17. The method of embodiment 12, 13, 14, 15, or 16 further comprising determining an amount of the purchase amount received form the sale of the greeting card stored-value card combination product to credit to an account associated with a greeting card stored-value card combination product greeting card manufacturer.
18. The method of embodiment 12, 13, 14, 15, 16, or 17 further comprising reconciling accounts belonging to at least two of the stored-value card issuer, the card transaction processor, the greeting card stored-value card combination product selling vendor, and the greeting card stored-value card combination product greeting card manufacturer to reflect a proper allocation of the purchase amount received from the sale of the greeting card stored-value card combination product.
19. The method of embodiment 18, further comprising initiating funds transfers to reflect the allocation.
20. The method of embodiment 12, 13, 14, 15, 16, 17, 18, or 19, further comprising instructing a stored-value card processor to update a datastore of to indicate that the stored-value card identified by the identifier has been activated.
21. The method of embodiment 12, 13, 14, 15, 16, 17, 18, 19, or 20, wherein the identifier is one of a stockkeeping unit, a universal product code, a European article number, a global trade item number, and an Australian product number.
22. A system for processing a sale of the greeting card stored-value card combination product of embodiment 1, 2, 3, 4, 5, 6, 7, 8, 9, 10, or 11, the system comprising;
a point of sale terminal;
a transaction routing service; and
a card processing service.
23. The system of embodiment 22, wherein the transaction routing service is operable for
receiving an activation request from the point of sale terminal,
transmitting the activation request to the card processing service,
receiving an activation response from the card processing service, and
transmitting the activation response to the point of sale terminal.
24. The system of embodiment 23, wherein the activation request comprises an identifier from the greeting card stored-value card combination product captured at the point of sale terminal, wherein the identifier identifies the product and uniquely identifies the stored-value card.
25. The system of embodiment 23, wherein the activation request includes an identifier from the greeting card stored-value card combination product, wherein the identifier identifies the greeting card stored-value card combination product; the card identifier uniquely identifying the stored-value card included in the greeting card stored-value card combination product, or combinations thereof.
26. The system of embodiment 22, 23, 24, or 25, wherein the system further comprises a settlement service.
27. The method of embodiment 26, further comprising determining an amount of the purchase amount received from the sale of the greeting card stored-value card combination product to credit an account associated with a stored-value card issuer.
28. The system of embodiment 26 or 27, wherein the settlement service is operable to determine an amount of a purchase amount received from a sale of the greeting card stored-value card combination product to credit to an account associated with a card transaction processor.
29. The system of embodiment 26, 27, or 28, wherein the settlement service is operable to determine an amount of a purchase amount received from a sale of the greeting card stored-value card combination product to credit to an account associated with a greeting card stored-value card combination product selling vendor.
30. The system of embodiment 26, 27, 28, or 29, wherein the settlement service is operable to determine an amount of a purchase amount received from a sale of the greeting card stored-value card combination product to credit to an account associated with a greeting card stored-value card combination product greeting card manufacturer.
31. The system of embodiment 26, 27, 28, 29, or 30, wherein the settlement service is operable to reconcile accounts belonging to at least two of the stored-value card issuer, the card transaction processor, the greeting card stored-value card combination product selling vendor, and the greeting card stored-value card combination product greeting card manufacturer to reflect a proper allocation of a purchase amount received from a sale of the greeting card stored-value card combination product.
32. A system for providing a customer choice in selecting the greeting card stored-value card combination product of embodiment 1, 2, 3, 4, 5, 6, 7, 8, 9, 10, or 11, comprising;
providing a plurality of greeting cards in a retail location; and
providing a plurality of stored-value cards in the retail location;
wherein at least a portion of the plurality of greeting cards are associated with at least a portion of the plurality of stored-value cards;
wherein the at least a portion of the plurality of greeting cards and the at least a portion of the plurality of stored-value cards are configured to allow a customer to select at least one of the portion of the plurality of greeting cards and at least one of the portion of the plurality of stored-value cards to purchase as the greeting card stored-value card combination product; and
wherein one of the selected greeting card and the selected stored-value card comprises a unique identifier identifying the greeting card stored-value card combination product and configured for allowing the stored-value card to be activated contemporaneously with the purchase of the greeting card stored-value card combination product.
33. The system of embodiment 32, wherein stored-value card is activatable by a one-step process.
34. The system of embodiment 32 or 33, wherein the stored-value card is activatable by a two-step process.

What is claimed is:
1. A system for processing a sale of a greeting card stored-value card combination product, the system comprising:
the greeting card stored-value card combination product;
a point of sale;

a greeting card, wherein the greeting card customer-selected from a plurality of greeting cards available to comprise the card stored-value card combination product;

a stored-value card, wherein the stored-value card is customer-selected from a plurality of stored-value cards available to comprise the greeting card stored-value card combination product;

a transaction routing service; and a card processing service, wherein the greeting card and the stored-value card comprise the greeting card stored-value card combination product, wherein an identifier encoded on at least one of the greeting card stored-value card combination product, the stored-value card, and the greeting card identifies the greeting card stored-value card combination product, the stored-value card, and the greeting card, wherein the identifier is interpretable by the point of sale, and wherein interpretation of the identifier by the point of sale facilitates activation of the stored-value card.

2. The system of claim 1, wherein the transaction routing service is operable for receiving an activation request from the point of sale, transmitting the activation request to the card processing service, receiving an activation response from the card processing service, and transmitting the activation response to the point of sale.

3. The system of claim 1, wherein the system further comprises a settlement service.

4. The system of claim 3, wherein the settlement service is operable to determine an amount of a purchase amount received from a sale of the greeting card stored-value card combination product to credit an account associated with a stored-value card issuer.

5. The system of claim 4, wherein the settlement service is operable to reconcile accounts belonging to at least two of the stored-value card issuer, a card transaction processor, a greeting card stored-value card combination product selling vendor, and a greeting card stored-value card combination product greeting card manufacturer to reflect a proper allocation of a purchase amount received from a sale of the greeting card stored-value card combination product.

6. The system of claim 1, wherein the identifier comprises at least one of an optically readable insignia, a magnetically encoded strip, and a radio frequency identification tag.

7. The system of claim 1, wherein the stored-value card is activatable by a one-step process.

8. The system of claim 1, wherein the stored-value card is activatable by a two-step process.

9. The system of claim 7, wherein the stored-value card is also activatable by a two-step process.

10. The system of claim 1, wherein the greeting card and the stored-value card are prepackaged as the greeting card stored-value card combination product.

11. A computer implemented method for processing a sale of a greeting card stored-value card combination product, the method comprising:

receiving, by a transaction routing service, an activation request, wherein the activation request includes an identifier from the greeting card stored-value card combination product captured at a point of sale terminal, wherein the identifier identifies the greeting card stored-value card combination product, a greeting card of the greeting card stored-value card combination product, wherein the greeting card is customer-selected from a plurality of greeting cards available to comprise the greeting card stored-value card combination product and a stored-value card of the greeting card stored-value card combination product, wherein the stored-value card is customer-selected from a plurality of stored-value cards available to comprise the greeting card stored-value card combination product;

determining, by the transaction routing service, a card processing service corresponding to the identifier;

transmitting, by the transaction routing service, the activation request to the card processing service;

receiving, by the transaction routing service, an activation response from the card processing service; and transmitting, by the transaction routing service to an interested party, the activation response.

12. The method of claim 11, further comprising determining, by the transaction routing service, an amount of the purchase amount received from the sale of the greeting card stored-value card combination product to credit an account associated with a stored-value card issuer.

13. The method of claim 11, further comprising determining, by the transaction routing service, an amount of the purchase amount received from the sale of the greeting card stored-value card combination product to credit to an account associated with a card transaction processor.

14. The method of claim 11, further comprising determining, by the transaction routing service, an amount of the purchase amount received from the sale of the greeting card stored-value card combination product to credit to an account associated with a greeting card vendor of the greeting card stored-value card combination product.

15. The method of claim 11, further comprising determining, by the transaction routing service, an amount of the purchase amount received from the sale of the greeting card stored-value card combination product to credit to an account associated with a greeting card manufacturer of the greeting card of the stored-value card combination product.

16. The method of claim 11, further comprising reconciling, by the transaction routing service, accounts belonging to at least two of a stored-value card issuer, a card transaction processor, a greeting card vendor of the greeting card stored-value card combination product, and a greeting card manufacturer of the greeting card of the greeting card stored-value card combination product to reflect a proper allocation of the purchase amount received from the sale of the greeting card stored-value card combination product.

17. The method of claim 16, further comprising initiating, by the transaction routing service, funds transfers to reflect the proper allocation.

18. The method of claim 11, further comprising instructing, by the transaction routing service, a stored-value card processor to update a datastore to indicate that the stored-value card identified by the identifier has been activated.

19. The method of claim 11, wherein the identifier is one of a stock-keeping unit, a universal product code, a European article number, a global trade item number, and an Australian product number.

* * * * *